United States Patent [19]

McManus et al.

[11] Patent Number: 5,698,172
[45] Date of Patent: Dec. 16, 1997

[54] OXIDATION-REDUCTION PROCESS

[75] Inventors: Derek McManus, Roselle; Myron Reicher, Arlington Heights; Barret A. Ferm, Naperville, all of Ill.

[73] Assignee: U.S. Filter/Engineered Systems, Plainfield, Ill.

[21] Appl. No.: 804,392

[22] Filed: Feb. 21, 1997

[51] Int. Cl.$^6$ .......................... B01D 53/48; B01D 53/52; B01D 53/62

[52] U.S. Cl. .......... 423/220; 423/226; 423/242.2; 423/573.1

[58] Field of Search ................... 423/220, 226, 423/242.2, 573.1

[56] References Cited

U.S. PATENT DOCUMENTS

| | | | |
|---|---|---|---|
| 3,226,320 | 12/1965 | Meuly | 210/63 |
| 4,091,073 | 5/1978 | Winkler | 423/226 |
| 4,189,462 | 2/1980 | Thompson | 423/573 G |
| 4,400,368 | 8/1983 | Diaz | 423/573 R |
| 4,556,546 | 12/1985 | Burgoyne, Jr. et al. | 423/226 |
| 4,622,212 | 11/1986 | McManus et al. | 423/226 |
| 5,180,572 | 1/1993 | Plummer | 423/576.7 |
| 5,273,734 | 12/1993 | Sawyer et al. | 423/573.1 |
| 5,648,054 | 7/1997 | DeBerry | 423/226 |

FOREIGN PATENT DOCUMENTS

| | | | |
|---|---|---|---|
| 56-13022A | 2/1981 | Japan | 423/220 |

OTHER PUBLICATIONS

*Sulphur* No. 224; by Ed Luinstra Hydrogen Sulphide Dissociation; $H_2$: A potential source of hydrogen; May–Jun. 1996.

*Hydrocarbon Processing*, Puraspec; Apr. 1996 p. 133.

*Hydrocarbon Processing*; Purisol; Apr. 1996 p. 133.

*Primary Examiner*—Gary P. Straub
*Assistant Examiner*—Timothy C. Vanoy
*Attorney, Agent, or Firm*—McDonnell Boehnen Hulbert & Berghoff

[57] ABSTRACT

An improved oxidation-reduction process is disclosed that uses a non-aqueous polyvalent metal catalyst system to remove volatile sulfur contaminants from gas streams. In addition to desulfurizing, the process also is useful for decarbonating and dehydrating process gas streams.

6 Claims, No Drawings

OXIDATION-REDUCTION PROCESS

FIELD OF THE INVENTION

This invention relates to an improved process for the treatment of gas streams contaminated with sulfur containing compounds and more particularly for the conversion of hydrogen sulfide to solid sulfur. The new process of this invention uses a new non-aqueous chelated polyvalent metal catalyst system for carrying out the oxidation-reduction reaction.

BACKGROUND OF THE INVENTION

Hydrogen sulfide and other volatile sulfur compounds are a major source of pollution of air streams since they are found and liberated in the production of natural gas and of combustible gases from coal, such as in the coking operations, as well as waste by-products in a number of chemical processes, such as sulfate or kraft paper pulp manufacture, viscose manufacture, sewage treatment, sulfurretting fatty oils, and producing organic sulfur compounds, as well as petroleum refining. These sulfur compounds are also present in geothermal steam used in power generating plants.

The use of an aqueous chelated metal catalyst solution for removing hydrogen sulfide from a gas stream is well known in the art. However, those processes all rely on aqueous catalyst systems containing amino and polyaminopolyacetic acid chelating ligands such as, nitrilotriacetic acid, ethylenediaminetetraacetic acid, N-hydroxyethyl ethylenediamine triacetic acid, and diethylenetriamine pentaacetic acid and alkali metal salts thereof. In those prior art processes an aqueous chelated metal catalyst solution is initially contacted in a gas-liquid contactor with hydrogen sulfide-containing gas, known as "sour gas," to effect oxidation of the hydrogen sulfide to elemental sulfur and concomitant reduction of the metal to a lower oxidation state. The catalyst solution is then regenerated for reuse by contacting it with an oxygen-containing gas to oxidize the metal to a higher oxidation state. The elemental sulfur is continuously removed from the process as a solid product. Illustrative of these prior oxidation-reduction processes is the description contained in U.S. Pat. No. 4,622,212 (McManus et al.) and the references cited therein.

Prior art processes also teach treating hydrogen sulfide ($H_2S$) containing gas streams contaminated with carbon dioxide ($CO_2$). For example, U.S. Pat. No. 4,091,073 describes a process using an aqueous catalyst system to convert $H_2S$ and a non-aqueous phase to absorb $CO_2$. Although the $CO_2$ is absorbed using solvents such as N-methyl pyrrolidone, the $H_2S$ is converted using an aqueous catalyst solution of Fe(III) chelate of (N-hydroxyethyl) ethylene diamine-N,N',N"-triacetic acid.

Prior oxidation-reduction processes for the catalytic removal of sulfur contaminants from gas streams universally involve the use of an aqueous catalyst system. By aqueous catalyst systems, we mean catalyst solution or formulations containing 90 wt. % or more of water. Specifically, the aqueous catalyst system was required because the catalyst formulations were soluble only in water and the catalyst precursor compounds were likewise only soluble in water. In addition, the prior art aqueous catalyst systems were very inexpensive to manufacture.

In addition to aqueous catalyst systems, there exist non-aqueous and non-catalytic absorption gas purification systems, one well known process being the Purisol™ process. The Purisol™ process allows for the non-catalytic removal of hydrogen sulfide, organic sulfur compounds, carbon dioxide and water from natural and refinery gases. These contaminants are absorbed in a N-methyl pyrrolidone solvent. Since the Purisol™ process uses no metal chelated catalyst, or any other type of catalyst, it has no means to convert the absorbed $H_2S$ to solid elemental sulfur, consequently complete or total separation of $H_2S$ and $CO_2$ is impossible. Accordingly, the absorbed $H_2S$ and $CO_2$, if present, must be stripped from the solvent and sent to a completely separate processing plant, such as a Claus kiln, where the $H_2S$ is separately and ultimately converted to elemental sulfur.

Until this invention, no oxidation-reduction process for the conversion of sulfur containing contaminants using a substantially water-free or substantially non-aqueous catalyst system was known or used. By "substantially non-aqueous" we mean a catalyst solution having a water content of preferably less than or equal to about 5 wt.% $H_2O$ and more preferably less than or equal to about 3 wt. % $H_2O$. Furthermore, until the present invention, it was unknown to sumultaneously desulfurize, decarbonate (i.e. remove/absorb carbon dioxide) and dehydrate a gas stream using a substantially water-free catalyst system.

While the aqueous prior art processes, and their associated catalyst compositions, described in the art have achieved sufficient efficiency and stability for commercial utilization, a need still exists for more efficient processes that can remove not only sulfur containing contaminants, but also carbon dioxide and water at the same time in a single process while producing and recovering a high grade of solid crystalline sulfur. This invention addresses these needs and in particular provides non-aqueous catalyst solutions that eliminate solid sulfur formation in the absorber section of the oxidation-reduction process, thereby solving an operating difficulty common to processes using aqueous catalyst systems. In addition, this invention produces a high grade of crystalline sulfur and greatly reduces equipment fouling and filtration problems. These and other advantages will become evident from the following more detailed description of the invention.

SUMMARY OF THE INVENTION

Accordingly, in one embodiment, the invention relates to an improved oxidation-reduction process using a non-aqueous catalyst system to contact the waste gas in the absorber section of the process. More particularly, the new non-aqueous catalyst system can be described as a polyvalent metal chelate dissolved in a solvent, for example, N-methyl pyrrolidone.

Still another embodiment of the invention relates to a process for the conversion of $H_2S$ to solid sulfur in which the $H_2S$ is contacted under conditions to convert $H_2S$ with a solution containing an effective amount of a non-aqueous polyvalent metal chelate composition. A preferred catalyst composition for the removal of hydrogen sulfide from waste gas streams is the metal chelate of acetylacetone (2, 4 pentanedione) dissolved in one or more of the following solvents: N-methyl pyrrolidone (NMP), N-formylmorpholine, morpholine, dimethyl sulfoxide, sulfolane, dimethyl formamide, propylene carbonate, 1,4-dioxane, 4-hydroxy-4-methyl-2-pentanone, propylene glycol methyl ether, 2-butoxyethanol, 4-methyl-2-pentanone (MIBK), and 2, 4 pentanedione. Other possible ligands that can be used to make the polyvalent metal chelate include those having the general formula $R_1\text{-CO-CH}_2\text{CO-}R_2$ where $R_1$ and $R_2$ may be identical and are selected from the group consisting of $CH_3$, $C_2H_5$, $C_6H_5$, $CF_3$ and $C_4H_3S$ (thenoyl). In addition, effective polyvalent metal chelates also include any of the above combinations wherein one of the two methylenic hydrogen atoms is replaced with one of the following substituents I, Br, Cl, SCN, SCI, $NO_2$, $CH_2Cl$, CHO, or $CH_2N(CH_3)_2$. The polyvalent metal is selected from the group consisting of iron, copper, cobalt, vanadium, nickel and manganese. A preferred polyvalent metal is iron and the series of reactions involved in catalytically oxidizing hydrogen sulfide to elemental sulfur using one embodiment of this invention, a non-aqueous iron chelate catalyst, can be represented by the following reactions, where L represents the complexed ligand:

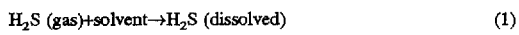
$$H_2S \text{ (gas)} + \text{solvent} \rightarrow H_2S \text{ (dissolved)} \quad (1)$$

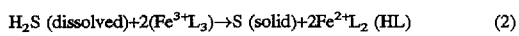
$$H_2S \text{ (dissolved)} + 2(Fe^{3+}L_3) \rightarrow S \text{ (solid)} + 2Fe^{2+}L_2 \text{ (HL)} \quad (2)$$

By combining equations (1) and (2) the resulting equation is:

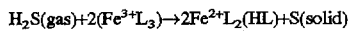
$$H_2S(gas) + 2(Fe^{3+}L_3) \rightarrow 2Fe^{2+}L_2(HL) + S(solid)$$

In order to have an economical workable process for removing hydrogen sulfide from a gaseous waste when a ferric iron chelate is used to effect catalytic oxidation of the hydrogen sulfide, it is essential that the reduced iron chelate formed in the above described manner be continuously regenerated by oxidizing to ferric iron chelate on contacting the reaction solution with dissolved oxygen, preferably from of ambient air, in the same or a separate contact zone. The series of reactions which take place when regenerating the metal chelate catalyst can be represented by the following equations:

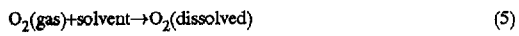
$$O_2(gas) + \text{solvent} \rightarrow O_2(\text{dissolved}) \quad (5)$$

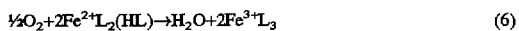
$$\tfrac{1}{2}O_2 + 2Fe^{2+}L_2(HL) \rightarrow H_2O + 2Fe^{3+}L_3 \quad (6)$$

And, when all equations are combined, the overall process can be represented by the following equation:

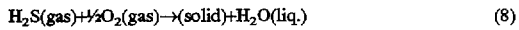
$$H_2S(gas) + \tfrac{1}{2}O_2(gas) \rightarrow (solid) + H_2O(liq.) \quad (8)$$

The liquid water formed during the oxidation step and absorbed from the incoming gas is continuously removed from the process of the present invention by any acceptable means known to the art, for example, evaporation, distillation, desiccation, dehydration or drying.

A primary object of the present invention is to provide an improved oxidation-reduction process that uses a non-aqueous catalyst composition to contact gas contaminated with volatile sulfur compounds to convert them to useable solid sulfur. It is also an object of this invention to provide a novel and improved catalyst composition for use in an oxidation-reduction process for desulfurizing, dehydrating and decarbonating gas streams to produce pipeline quality natural gas.

Yet another object of the present invention is to provide an improved continuous process for the conversion of sulfur contaminants in a gaseous stream to crystalline solid sulfur without the need for a separate sulfur recovery unit.

Finally, still another object is to provide a non-aqueous oxidation reduction process using a polyvalent metal chelate catalyst that avoids the problem of sulfur deposition in the absorber and other critical sections of the process.

DETAILED DESCRIPTION OF PREFERRED EMBODIMENTS

The particular type of gas stream that can be treated by this invention is not critical. Streams particularly suited to the removal of sulfur contaminants and $CO_2$ are naturally occurring gases, such as natural gas, synthesis gases, process gases, and fuel gases produced by gasification procedures, e.g., gases produced by the gasification of coal, petroleum, shale, tar sands, etc. These sulfur compounds are also present in geothermal steam used in power generating plants. The hydrogen sulfide content of contaminated gas streams vary extensively, but in general, will range from about 100% to about 2 ppm. The types of sulfur compounds that are removed by this invention include hydrogen sulfide, carbonyl sulfide and other volatile sulfur compounds. Likewise, the $CO_2$ content of the gases to be treated will vary, but is found generally to be in the range of from about 95% to 2%.

In addition to the removal of volatile sulfur contaminants and $CO_2$ from waste gas, the process of this invention can remove water vapor that may be present in the incoming gas stream. Water vapor removal or dehydration occurs because of the hygroscopic nature of the non-aqueous solvents used in the formulation of the non-aqueous catalyst system. These non-aqueous solvents have a great affinity to absorb water. Water is sometimes brought into the process with the gas to be treated, for example when natural gas is treated. Water is also formed in the process of this invention during the oxidation step. All the water formed or brought into the process, however, is continuously removed from the process by distillation and/or evaporation of the catalyst solution such that the when the catalyst solution is returned to the absorber section of the process to be contacted with the incoming gas to be treated it is substantially water free (i.e. non-aqueous). In prior art oxidation-reduction processes that use aqueous catalyst systems, the water content of the catalyst contacting the incoming the gas to be treated is normally greater than 90 wt. %, whereas the catalyst of this invention is substantially free of water (i.e. substantially non-aqueous) preferably having a water content of less than or equal to about 5 wt. % $H_2O$ and more preferably less than or equal to about 3 wt. % $H_2O$. Furthermore, the very small amount of water that is found in the catalyst solution is present only as an impurity stemming from either water present in the process gas to be treated or that produced as a reaction product during the oxidation of $H_2S$ to S. A important characterization of this invention is that water is not needed or used as a solvent for the metal chelate.

The improved-oxidation reduction process of the invention is characterized in that the catalyst compositions used are non-aqueous in nature. As such, a critical feature of the invention is the use of a non-aqueous catalyst system. More particularly, novelty stems from the use of a polyvalent metal chelate dissolved in a non-aqueous solvent to form a catalyst composition substantially devoid of water. A preferred polyvalent metal chelate is iron acetylacetonate and a preferred solvent is N-methyl pyrrolidone.

The chelated metal catalyst solution of the present invention is preferably prepared by dissolving commercially available ferric acetylacetonate in the non-aqueous solvent at an appropriate concentration, for example, 10 wt. %. Another method involves taking a saturated aqueous solution of ferric sulfate and combining it with an appropriate amount of the non-aqueous solvent containing a threefold molar excess of acetylacetone. This method produces a catalyst solution concentrate that contains a minor amount of water. However, when mixed with non-aqueous solvent in the industrial plant, the quantity of water present in the circulating, non-aqueous polyvalent metal catalyst solution becomes trival and is considerably less than 5 wt. %.

Yet another method of preparing the catalyst takes advantage of the fact that certain polyvalent metal salts are soluble in the non-aqueous solvent. For example, ferric chloride can be dissolved in N-methyl pyrrolidone. Hence, a polyvalent metal chelate catalyst solution can be prepared by dissolving ferric chloride in N-methyl pyrrolidone and adding a threefold molar excess, with respect to iron, of acetyl acetone.

The polyvalent metal content of the operating solution can vary over a wide range, dependent upon the composition of the gas being treated and other factors. Typically, when an iron chelate catalyst is used, the iron content of the operating solution may be from about 5 ppm to about 20,000 ppm, with 200 to 10,000 ppm being preferred, although in some operations the iron content can be >20,000 ppm. The amount of chelating agent should be at least sufficient to fully chelate all of the iron in the solution and preferably somewhat in excess of that amount.

In a preferred embodiment the chelating agents of this invention are used in sufficient amount so that the polyvalent metal is chelated predominantly with three moles of the chelating agents per mole of polyvalent metal. The mole ratio of chelating agent to iron should be at least about 3:1 to ensure that substantially all of the polyvalent metal is present as the trimer for the chelating agent-metal complex, although acceptable results can be obtained at less than the 3:1 ratio.

Although the above-described catalyst formulations are presented in detail, there exists many alternative routes that allow non-aqueous catalyst systems to be prepared and subsequently used in oxidation-reduction processes to remove sulfur containing compounds, carbon dioxide and water from gas streams. Further the invention thus far has been described with particular emphasis on the use of iron as the polyvalent metal of choice, however, other polyvalent metals can also be used. Such additional polyvalent metals include copper, cobalt, vanadium, manganese, platinum, tungsten, nickel, mercury, tin and lead.

The art is replete with different process flow schemes and conditions to effect the conversion of $H_2S$ to solid sulfur. None of these prior known processes, however, have utilized the non-aqueous catalyst systems of this invention. Likewise, none of those prior processes achieve removal of $H_2S$, $CO_2$ and $H_2O$ in a single process with integrated conversion of $H_2S$ and COS to S. However, several of the various methods known in the art can be used to effect the required intimate contact between the sulfur contaminated gas and the non-aqueous catalyst solution of this invention, including, for example, an anaerobic system can be used where oxidation of hydrogen sulfide and regeneration of the catalyst solution are effected in separate vessels or reaction zones. Reference is made to the Thompson U.S. Pat. No. 4,189,462 patent for a detailed explanation of this known processing system and which is incorporated herein by reference.

The contacting of the contaminated gas stream with the non-aqueous operating solution in the oxidation step is often carried out at ambient conditions of temperature and pressure, but temperatures of from about 5 to about 65° C. and pressures ranging from subatmospheric to 100 atmospheres or greater can be used. In an anaerobic system the regeneration of the catalyst solution is effected by contacting the used or spent catalyst solution with air or other oxygen-containing gas at ambient conditions, although higher pressures and other temperatures can be used in some circumstances.

To remove and recover the solid sulfur that results from the catalytic conversion of the hydrogen sulfide in a controlled manner, it is necessary to cool the non-aqueous catalyst solution to cause the solid sulfur dissolved in the non-aqueous solvent to crystallize and fall out of solution in an appropriate zone. The crystalline sulfur is then easily removed from the process via filtration, centrifugation or other commonly used separation methods.

EXAMPLE I

A catalyst solution was prepared by dissolving 6.325 g ferric acetylacetonate in 1000 $cm^3$ N-methyl pyrrolidone. Hydrogen sulfide and air were co-sparged into 20 $cm^3$ of the above solution at approximate rates of 2 and 100 $cm^3$/minute, respectively, for 20 hours at room temperature and atmospheric pressure. Bright yellow, crystalline elemental sulfur separated from solution and was isolated as a high purity product by filtration and water washing.

EXAMPLE II

A catalyst solution was prepared by dissolving 6.325 g ferric acetylacetonate in 1000 $cm^3$ N-methyl pyrrolidone. Carbonyl sulfide and air were co-sparged into 20 $cm^3$ of the above solution at approximate rates of 2 and 100 $cm^3$/minute, respectively, for 20 hours at room temperature and atmospheric pressure. Bright yellow, crystalline elemental sulfur separated from solution and was isolated as a high purity product by filtration and water washing.

We claim:

1. A catalytic oxidation-reduction process for removing sulfur contaminants selected from the group consisting of hydrogen sulfide, carbonyl sulfide and mixtures thereof from a gaseous fluid stream comprising the following steps, in combination, (a) contacting a reactant gaseous stream containing sulfur contaminants in a contact zone with a non-aqueous catalyst solution comprising (i) a solvent selected from the group consisting of N-methyl pyrrolidone, N-formylmorpholine, morpholine, dimethyl sulfoxide, sulfolane, dimethyl formamide, propylene carbonate, 1,4-dioxane, 4-hydroxy-4-methyl-2-pentanone, propylene glycol methyl ether, 2-butoxyethanol, 4-methyl-2-pentanone, 2, 4 pentanedione and mixtures thereof, and (ii) a oxidized polyvalent metal chelate catalyst having the following formula: $ML_3$ where L has the formula $R_1$ CO $CH_2$ $COR_2$, where $R_1$ and $R_2$ are selected from group consisting of $CH_3$, $C_2H_5$, $C_6H_5$, $CF_3$ and $C_4H_3S$ (thenoyl) and M is a polyvalent metal that exists in more than one oxidation state, to produce a gaseous stream having a reduced sulfur contaminant concentration and an admixture containing solid crystalline sulfur and reduced polyvalent metal chelate catalyst;

(b) removing the crystalline sulfur from the process;

(c) regenerating the admixture from step (a) by contacting the admixture with an oxidant and producing regenerated polyvalent metal chelate catalyst;

(d) removing any water formed or absorbed during processing from the process; and (e) recycling the regenerated polyvalent metal chelate catalyst after water removal back to the contact zone.

2. The process of claim 1 wherein the gaseous fluid stream contains carbon dioxide.

3. The process of claim 1 wherein the gaseous fluid stream contains water.

4. The process of claim 1 wherein one of the methylenic hydrogen atoms of L is replaced with a substituent selected from the group consisting of I, Br, Cl, SCN, SCl, $NO_2$, $CH_2Cl$, CHO and $CH_2N(CH_3)_2$.

5. A catalytic oxidation-reduction process for removing sulfur contaminants selected from the group consisting of hydrogen sulfide, carbonyl sulfide and mixtures thereof from a gaseous fluid stream comprising the following steps, in combination, (a) contacting a reactant gaseous stream containing sulfur contaminants in a contact zone with a non-aqueous catalyst solution comprising N-methyl pyrrolidone and iron (III) acetyl acetonate to produce a gaseous stream having a reduced sulfur contaminant concentration and an admixture containing solid crystalline sulfur and the non-aqueous catalyst solution;

(b) regenerating the admixture from step (a) by contacting the admixture with an oxidant and producing regenerated iron acetyl acetonate;

(c) removing the crystalline sulfur from the process;

(d) removing any water formed or absorbed during processing from the process; and (e) recycling the regenerated iron (III) acetyl acetonate back to the contact zone.

6. A catalytic oxidation-reduction process for removing sulfur contaminants selected from the group consisting of hydrogen sulfide, carbonyl sulfide and mixtures thereof and carbon dioxide from a gaseous fluid stream comprising the following steps, in combination, (a) contacting a reactant gaseous stream containing sulfur contaminants and carbon dioxide in contact zone with a non-aqueous catalyst solution comprising N-methyl pyrrolidone and iron (III) acetyl acetonate to produce a gaseous stream having a reduced sulfur contaminant concentration and a reduced carbon dioxide concentration, and an admixture containing solid crystalline sulfur, dissolved carbon dioxide and the non-aqueous catalyst solution;

(b) regenerating the admixture from step (a) by contacting the admixture with an oxidant and producing regenerated iron acetyl acetonate;

(c) removing the crystalline sulfur and dissolved carbon dioxide from the process;

(d) removing any water formed or absorbed during processing from the process; and (e) recycling the regenerated iron (III) acetyl acetonate back to the contact zone.

* * * * *